United States Patent
Nie et al.

(10) Patent No.: US 10,376,973 B2
(45) Date of Patent: Aug. 13, 2019

(54) CHAIN SAW

(71) Applicant: CHERVON (HK) LIMITED, Wanchai (HK)

(72) Inventors: Fangjie Nie, Nanjing (CN); Huixing Fu, Nanjing (CN); Wen Chang, Nanjing (CN)

(73) Assignee: CHEVRON (HK) LIMITED, Wanchai (HK)

( * ) Notice: Subject to any disclaimer, the term of this patent is extended or adjusted under 35 U.S.C. 154(b) by 229 days.

(21) Appl. No.: 15/234,509

(22) Filed: Aug. 11, 2016

(65) Prior Publication Data

US 2017/0043421 A1   Feb. 16, 2017

(30) Foreign Application Priority Data

Aug. 14, 2015  (CN) .......................... 2015 1 0502273

(51) Int. Cl.
  *B23D 57/02*  (2006.01)
  *B27B 17/14*  (2006.01)
(52) U.S. Cl.
  CPC ............ *B23D 57/023* (2013.01); *B27B 17/14* (2013.01)
(58) Field of Classification Search
  CPC .............................. B23D 57/023; B27B 17/14
  USPC .................................................... 30/381–386
  See application file for complete search history.

(56) References Cited

U.S. PATENT DOCUMENTS

| 5,070,618 | A | 12/1991 | Edlund | |
|---|---|---|---|---|
| 7,743,513 | B1* | 6/2010 | Fisher | B27B 17/14 30/383 |
| 9,718,208 | B2* | 8/2017 | Takayanagi | B27B 17/14 |
| 2010/0146801 | A1 | 6/2010 | Pellenc | |
| 2013/0345003 | A1* | 12/2013 | Maag | B27B 17/14 474/117 |
| 2014/0150271 | A1* | 6/2014 | Yamaoka | B27B 17/14 30/386 |
| 2015/0224631 | A1 | 8/2015 | Chen | |

OTHER PUBLICATIONS

CIPO, office action issued on Canadian patent application No. 2,938,777, dated Jun. 29, 2017, 5 pages.

* cited by examiner

*Primary Examiner* — Omar Flores Sanchez
(74) *Attorney, Agent, or Firm* — Greenberg Traurig, LLP

(57) ABSTRACT

A chainsaw includes a housing, a prime mover, a transmitting member and a bias assembly. The prime mover is mounted to the housing. The saw chain is driven by the prime mover. The guide bar guides the saw chain and the guide bar is slidably connected to the housing. The driving member drives the guide bar to slide relative to the housing. The operating member swings forth and back relative to the housing. The transmitting member enables the driving member to rotate synchronously with the operating member when the operating member is swung forth and enables the operating member to rotate relative to the driving member when the operating member is swung back. The bias assembly biases the transmitting member to engage with the operating member when the operating member is swung forth.

12 Claims, 9 Drawing Sheets

CHAIN SAW

RELATED APPLICATION INFORMATION

This application claims the benefit under 35 U.S.C. § 119(a) of Chinese Patent Application No. CN 201510502273.0, filed on Aug. 14, 2015, the disclosure of which is incorporated herein by reference in its entirety.

FIELD OF THE DISCLOSURE

The present disclosure relates generally to a chainsaw and, more particularly, to a chainsaw having an adjustment mechanism.

BACKGROUND OF THE DISCLOSURE

A chain saw is a type of lawn and garden tool that is used to cut timber or branches. A chain saw includes a powering device that causes staggered L-shaped blades on a chain to move transversely relative to a cutting surface. Since the chain links in the saw chain of the chain saw wear in use, the chain becomes longer and loose on a guide plate so that the chain saw cannot operate normally. Therefore, a tensioning force applied on the saw chain needs to be adjusted frequently to ensure normal operation of the chain saw.

For adjusting the tensioning force applied to the saw chain two methods are currently known. In one method the tensioning force is adjusted via use of an external tool. In another method the tensioning force is adjusted via use of an adjusting mechanism carried by the chain saw. In the latter case, the tension of the saw chain is generally adjusted by using a screw rod to cause a tensioning nut to move to adjust the relative positions of the guide plate and the saw chain.

More particularly, to provide chain tensioning in the latter case a chain saw includes a housing and a cover plate, wherein the housing and the cover plate are fastened together by means of the mating of a bolt fixedly mounted on the housing and a connecting hole provided on the cover plate. In the housing there is mounted a chain wheel for driving the chain and a guide plate which cooperates with the chain wheel to support and guide the chain. The guide plate is provided with a guide plate mounting hole, the cover plate is provided with a chain saw tensioning mechanism wherein the screw rod drives the tensioning nut, a guide plate connecting portion of the tensioning nut is received in the guide plate mounting hole, the screw rod is manually rotated to cause the tensioning nut to move in an axial direction of the screw rod to achieve the tensioning of the chain by adjusting relative positions of the guide plate and the chain. It is seen, however, that it is not comfortable to operate the adjusting mechanism and the operator cannot accurately adjust the adjusting mechanism. For example, when the operator wants the move the guide plate forward and the screw rod is manually rotated by the operator, the guide plate tends to moves back.

The statements in this section merely provide background information related to the present disclosure and may not constitute prior art.

SUMMARY

A chainsaw may include a housing, a prime mover, a transmitting member and a bias assembly. The prime mover is mounted to the housing. The saw chain is driven by the prime mover. The guide bar guides the saw chain and the guide bar is slidably connected to the housing. The driving member drives the guide bar to slide relative to the housing. The operating member swings back and forth relative to the housing. The transmitting member enables the driving member to rotate synchronously with the operating member when the operating member is swung forth and enables the operating member to rotate relative to the driving member when the operating member is swung back. The bias assembly biases the transmitting member to engage with the operating member when the operating member is swung forth.

The chainsaw may include a control member. The control member is operated by an operator to move to a first position or a second position for adjusting the bias direction of the bias assembly. The control member rotatably connects to the driving member. The bias assembly may include a limiting member and a biasing member. The limiting member slidably connects to the control member and a biasing member connects between the limiting member and the control member. The operating member may form an annular gear. The transmitting member may form a first engaging portion and a second engaging portion. The first engaging portion engages the annular gear when the control member is in the first position and enables the driving member to drive the guide bar to move to tension the saw chain. The second engaging portion engages the annular gear when the control member is in the second position and enables the driving member to drive the guide bar to move to loosen the saw chain.

A chainsaw may include a housing, a prime mover, a saw chain, a guide bar, a driving member, an operating member and a control member. The prime mover is mounted to the housing. The saw chain is driven by the prime mover. The guide bar guides the saw chain and the guide bar is slidably connected to the housing. The driving member drives the guide bar to slide relatively to the housing. The operating member is operated by an operator to swing relatively to the housing. The operating member is configured to swing back and forth relative to the housing by an operator. The control member is movably connected to the driving member and the control member is operated by an operator to move to a first position or a second position relative to the driving member. The driving member is capable of driving the guide bar to tension the saw chain when the control member is in the first position and the operating member is swung by an operator. The driving member is capable of driving the guide bar to move forth so as to tension the saw chain when the control member is in the first position and the operating member is swung by an operator. The driving member is capable of driving the guide bar to loosen the saw chain when the control member is in the second position and the operating member is swung by an operator. The driving member is capable of driving the guide bar to move back so as to loosen the saw chain when the control member is in the second position and the operating member is swung by an operator. The driving member rotates in the forward direction when the control member is in the first position. The driving member rotates in the reverse direction when the control member is in the second position. The control member rotatably connects to the driving member.

The chainsaw may further include a transmitting member. The transmitting member rotatably connects to the driving member about a first axis and the transmitting member performs a transmission between the operating member and the driving member. The chainsaw may further include a bias assembly. The bias assembly biases the transmitting member to engage the operating member. The bias assembly may include a limiting member and a biasing member. The limiting member slidably connects to the control member and the biasing member connects between the limiting member and the control member. The operating member forms an annular gear. The transmitting member forms a first engaging portion and a second engaging portion. The first engaging portion engages the annular gear when the control member is in the first position and enables the driving member to drive the guide bar to move to tension the saw chain and the second engaging portion engages the annular gear when the control member is in the second position and enables the driving member to drive the guide bar to move to loosen the saw chain. The driving member rotates about a third axis which is parallel to the first axis and spaces away from the first axis. The operating member is swung about a second axis which is coaxial with the third axis. The operating member swings about a second axis which is perpendicular to the slide direction of the guide bar.

A chainsaw may include a housing, a prime mover, a saw chain, a guide bar, a driving member, an operating member and a transmitting member. The prime mover is mounted to the housing. The saw chain is driven by the prime mover. The guide bar guides the saw chain and the guide bar is slidably connected to the housing. The driving member drives the guide bar to slide relative to the housing. The operating member is operated by an operator and swings relative to the housing. The transmitting member performs a transmission between the operating member and the driving member. The transmitting member enables the driving member to rotate synchronously with the operating member when the operating member is swung along a first direction, and enables the operating member to rotate relative to the driving member when the operating member is swung along a second direction which is opposite to the first direction.

The transmitting member rotatably connects to the driving member about a first axis. The operating member rotates about a second axis which is parallel to the first axis and spaced from the first axis. The chainsaw may further include a control member. The control member is operated by an operator to move to a first position or a second position. The driving member rotates in the forward direction when the control member is in the first position. The driving member rotates in the reverse direction when the control member is in the second position. The control member rotatably connects to the driving member. The chainsaw may further include a bias assembly. The bias assembly biases the transmitting member so the transmitting member engages the operating member. The bias assembly may include a limiting member and a biasing member. The limiting member slidably connects to the control member. The biasing member connects between the limiting member and the control member.

When the control member is in the first position and the operating member swings forth, the guide bar moves forth. The guide bar and the operating member move in the same direction. When the control member is in the first position and the operating member swings back, the guide bar does not move back. Therefore, when the operator wants to move the guide bar forth, the guide bar does not move back. When the control member is in the second position and the operating member swings back, the guide bar moves back. The guide bar and the operating member move in the same direction. When the control member is in the second position and the operating member swings forth, the guide bar does not move forth. In this manner, it is easy to adjust the tension of the saw chain.

Further areas of applicability will become apparent from the description provided herein. It should be understood that the description and specific examples are intended for purposes of illustration only and are not intended to limit the scope of the present disclosure.

Figure 1:
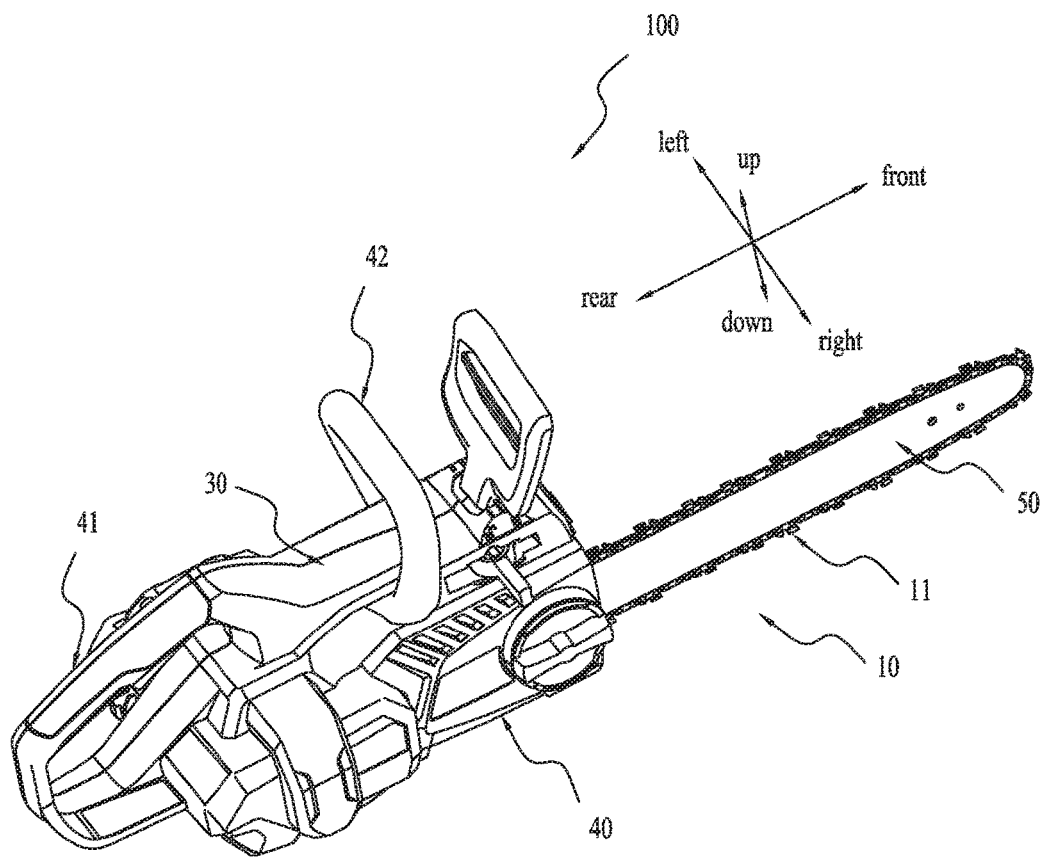
FIG. 1 is a schematic view of an exemplary chainsaw.

The drawings described herein are for illustrative purposes only of selected embodiments and not all possible implementations, and are not intended to limit the scope of the present disclosure. Corresponding reference numerals indicate corresponding parts throughout the several views of the drawings.

DETAILED DESCRIPTION

The following description of the preferred embodiment is merely exemplary in nature and is in no way intended to limit the invention hereinafter claimed, its application, or uses.

Figure 2:
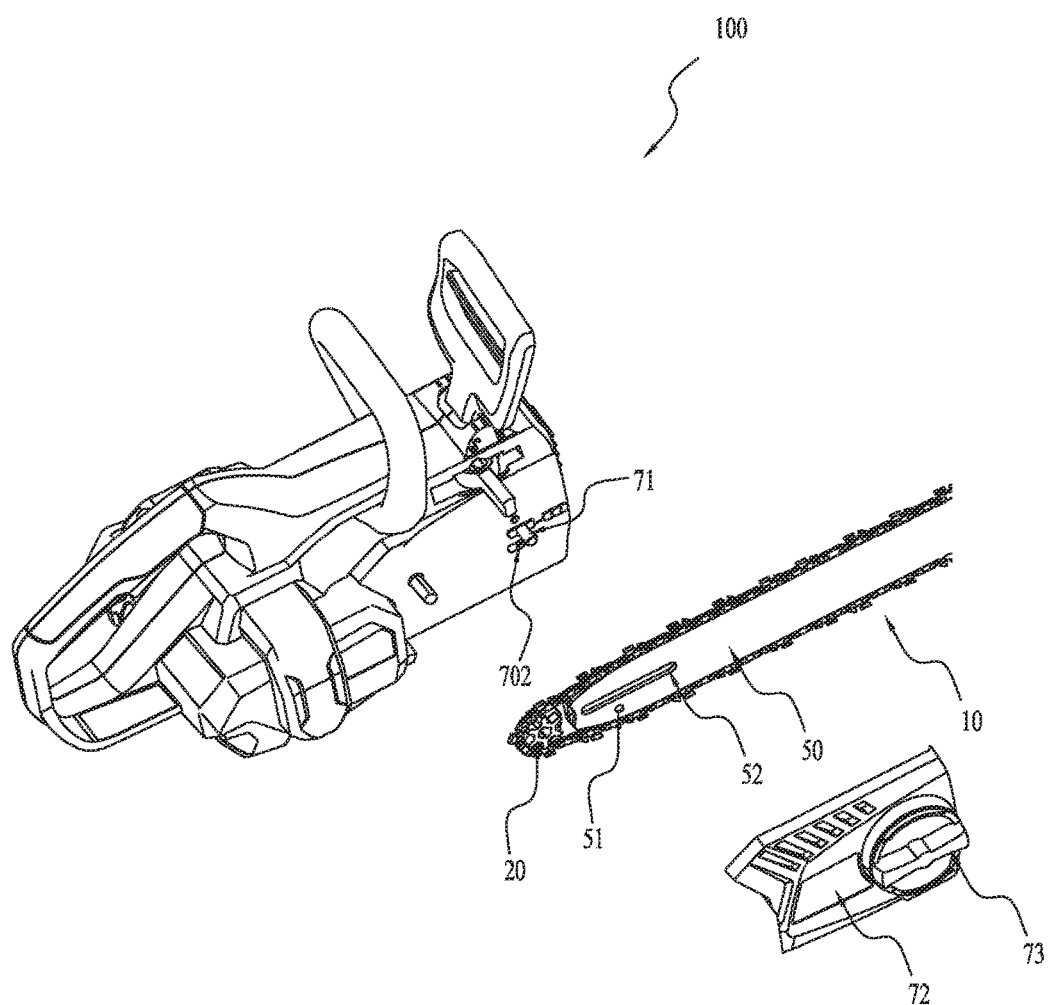
FIG. 2 is an exploded schematic view of the chainsaw of FIG. 1.

Referring to FIGS. 1-2, a chainsaw 100 may include a saw chain 10, a drive sprocket 20, a prime mover 30, a housing 40 and a guide bar 50.

The saw chain 10 may have a plurality of cutting edges 11. The saw chain 10 is arranged on the guide bar 50. The guide bar 50 guides the saw chain 10. The drive sprocket 20 engages the links of the saw chain 10 and propels the saw chain 10 about the guide bar 50. The drive sprocket 20 is driven to rotate by the prime mover 30. The prime mover 30 may be an internal combustion engine or an electrical motor. In particular, the prime mover 30 is an electrical motor. The prime mover 30 is mounted to the housing 40. The guide bar 50 is slidably connected to the housing 40.

A handle 41 is arranged on the housing 40 for guiding the chainsaw 100 during operation. The chainsaw 100 may have an auxiliary handle 42 which extends over the housing 40.

The chainsaw 100 may have an adjustment mechanism 60 for adjusting the tension of the saw chain 10. The adjustment mechanism 60 drives the guide bar 50 to slide relative to the housing 40. The guide bar 50 moves forth to tension the saw chain 10 and the guide bar 50 moves back to loosen the saw chain 10.

As shown in FIG. 2, the chainsaw 100 may have a stud bolt 71. The stud bolt 71 is fixed on the housing 40. The guide bar 50 may have a sliding groove 52 coupled with the stud bolt 71. The stud bolt 71 projects through the sliding groove 52 of the guide bar 50. The stud bolt 71 can slide in the sliding groove 52, the guide bar 50 can move relative to the housing 40. The chainsaw 100 may include a cover 72 and a knob 73. The drive sprocket 20 is covered by the cover 72. The knob 73 is coupled to the stud bolt 71 for locking the cover 72 and the guide bar 50. The operator may turn the knob 73 to open the cover 72 so that the saw chain 10 and the guide bar 50 can be removed and replaced.

Figure 4:
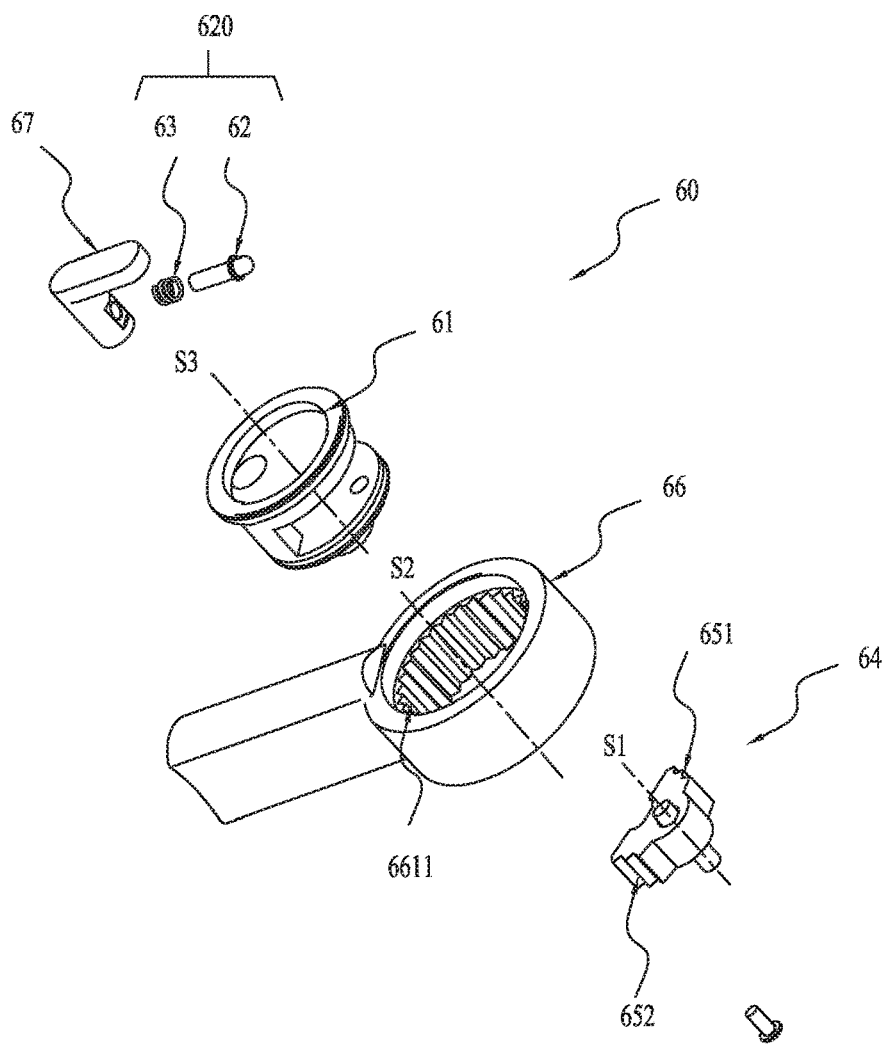
FIG. 4 is an exploded schematic view of the adjustment mechanism of the chainsaw of FIG. 1.

As shown in FIG. 4, an adjustment mechanism 60 includes a driving member 61, a bias assembly 620, a transmitting member 64, an operating member 66 and a control member 67. The bias assembly 620 may include a limiting member 62 and a biasing member 63.

Figure 3:
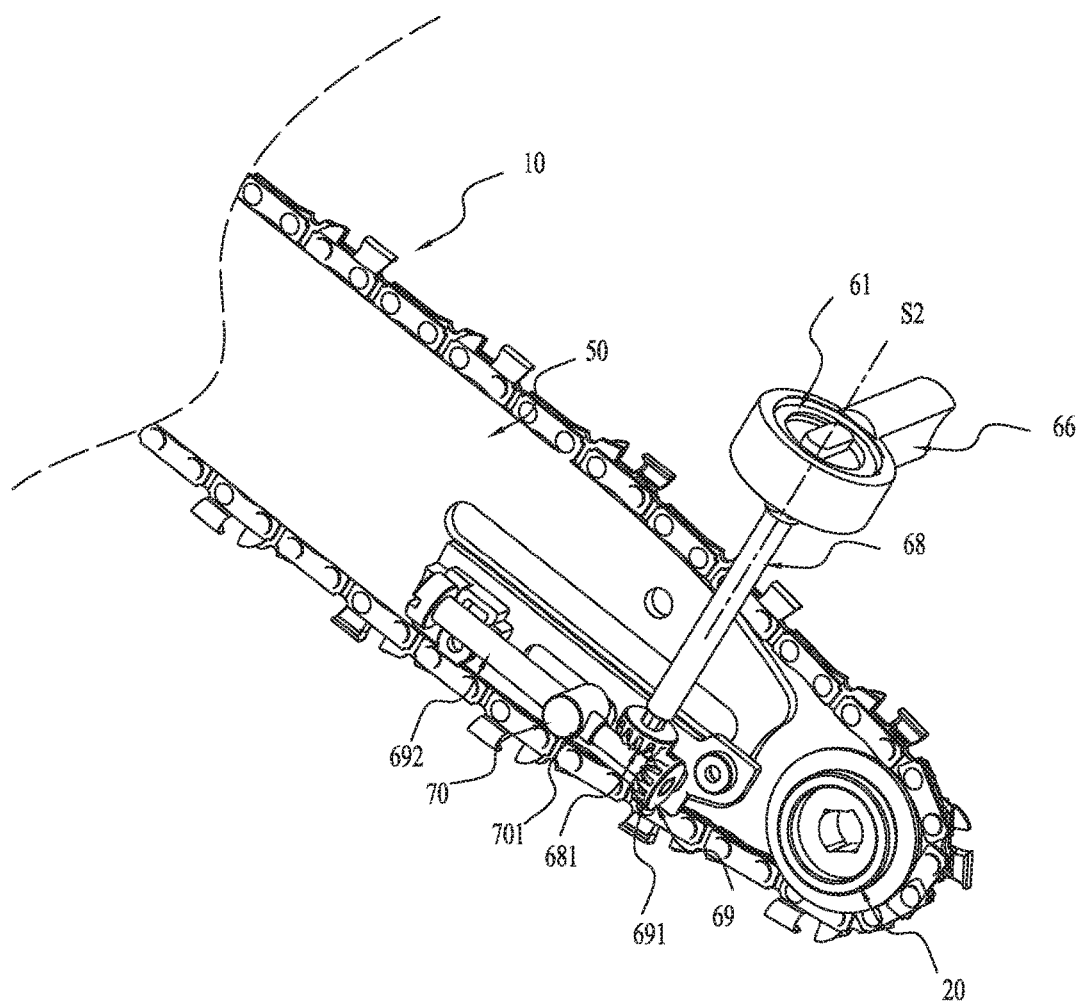
FIG. 3 is a schematic view of an exemplary guide bar and an adjustment mechanism of the chainsaw of FIG. 1.

The driving member 61 drives the guide bar 50 to slide relatively to the housing 40. The operating member 66 is configured to be operated by an operator to rotate relative to the housing 40. The operating member 66 swings relative to the housing 40. The operating member 66 swings forth and back relative to the housing 40. The transmitting member 64 performs a transmission between the operating member 66 and the driving member 61. The transmitting member 64 rotatably connects to the driving member 61 about a first axis S1. The operating member 66 rotates about a second axis S2. The operating member 66 swings about a second axis S2. The driving member 61 rotates about a third axis S3 which is parallel to the first axis S1 and spaced away from the first axis S1. The second axis S2 is coaxial with the third axis S3. The bias assembly 620 biases the transmitting member 64 to engage with the operating member 66. Referring to FIGS. 3-4, the second axis S2 is perpendicular to the slide direction of the guide bar 50.

Referring to FIGS. 4-8, the control member 67 moveably connects to the driving member 61. The control member 67 rotatably connects to the driving member 61. The control member 67 has a first position and a second position relative to the driving member 61. The control member 67 can be moved to the first position or the second position by an operator. The control member 67 can adjust the bias direction of the bias assembly 620. The limiting member 62 slidably connects to the control member 67. The biasing member 63 connects between the limiting member 62 and the control member 67. The biasing member 63 is a spring.

As shown in FIG. 3, the driving member 61 rotates in the forward direction, and the driving member 61 drives the guide bar 50 to tension the saw chain 10. The driving member 61 rotates in the reverse direction, and the driving member 61 drives the guide bar 50 to loosen the saw chain 10.

The chainsaw 100 may include a bar adjustment shaft 68, a driving shaft 69 and a sliding part 70. The bar adjustment shaft 68 is fixed to the driving member 61. The bar adjustment shaft 68 and the driving member 61 rotate together. A first gear 681 is configured to the bar adjustment shaft 68. A second gear 691 is configured to the driving shaft 69. The second gear 691 engages with the first gear 681. The bar adjustment shaft 68 drives the driving shaft to rotate. A worm gear 695 is configured to the driving shaft 69. A turbine 701 is configured to the sliding part 70. The worm gear 695 engages the turbine 701. The driving shaft 69 drives the sliding part 70 to slide.

Referring to FIGS. 2-3, a bump 702 is configured to the sliding part 70. The guide bar 50 forms an adjustment hole 51 coupling with the bump 702. The sliding part 70 slides and drives the guide bar 50 to slide.

Figure 5:
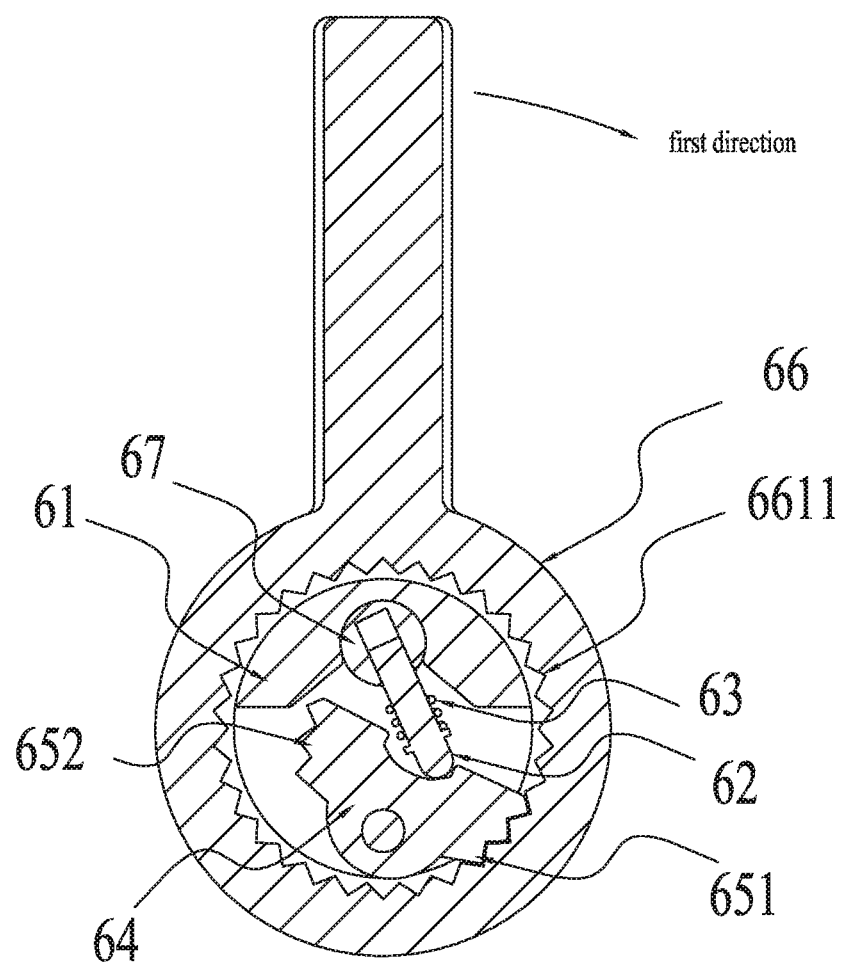
FIG. 5 is a section view of an exemplary control member in the first position and a first engaging portion engaging an annular gear of the chainsaw of FIG. 1.
Figure 6:
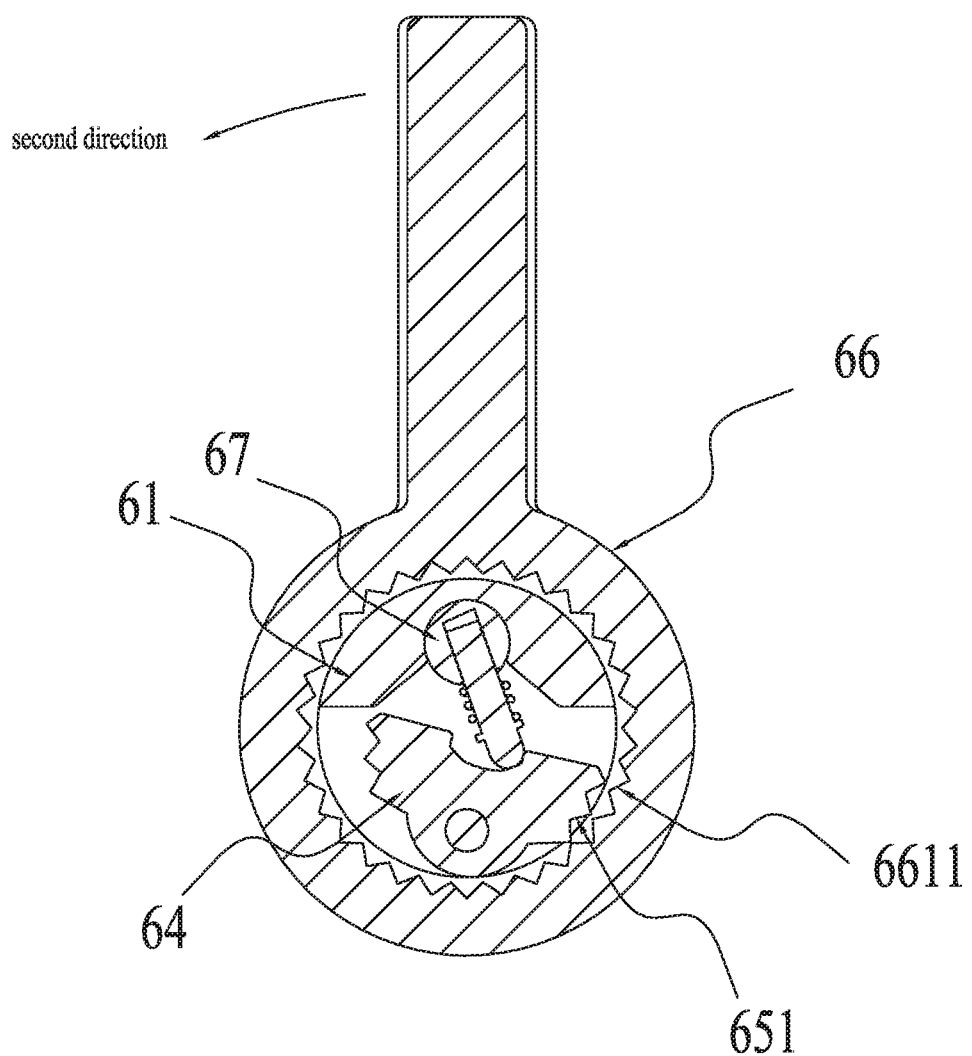
FIG. 6 is a section view of an exemplary control member in the first position and a first engaging portion disengaging a annular gear of the chainsaw of FIG. 1.

Referring to FIGS. 5-6, the control member 67 is in the first position. As shown in FIG. 5, the operating member 66 is swung forth by an operator. The transmitting member 64 enables the driving member 61 to rotate synchronously with the operating member 66. The driving member 61 rotates synchronously with the operating member 66 when the operating member 66 is swung along a first direction. The operating member 66 drives the driving member 61 to rotate in the forward direction. Therefore, the guide bar 50 can be driven by the driving member 61 to slide to tension the saw chain 10. The operating member 66 forms an annular gear 6611. The annular gear has some teeth. The transmitting member 64 forms a first engaging portion 651 and a second engaging portion 652. The first engaging portion 651 has at least one tooth. The second engaging portion 652 has at least one tooth. When the control member 67 is in the first position, the bias assembly 620 biases the transmitting member 64 to engage with the operating member 66. When the control member 67 is in the first position, the limiting member 62 touches the transmitting member 64 and enables the first engaging portion 651 to engage the annular gear 6611.

As shown in FIG. 6, when the operating member 66 is swung along a second direction which is opposite to the first direction, the operating member 66 rotates relative to the driving member 61. When the operating member 66 is swung back, the transmitting member 64 enables the driving member 61 to rotate relative to the driving member 61. The first engaging portion 651 disengages the annular gear 6611. The operating member 66 cannot drive the driving member 61 to rotate and the driving member 61 keeps still. The guide bar 50 keeps still.

Referring to FIGS. 5-6, when the control member 67 is in the first position, the operating member 66 is swung by an operator to drive the driving member 61 to rotate in the forward direction. The operating member 66 is swung back and forth by an operator, the driving member 61 rotates in the forward direction. The driving member 61 cannot rotate in the reverse direction. The driving member 61 drives the guide bar 50 to move forth so as to tension the saw chain 10, when the control member 67 is in the first position and the operating member 66 is swung by an operator.

Figure 7:
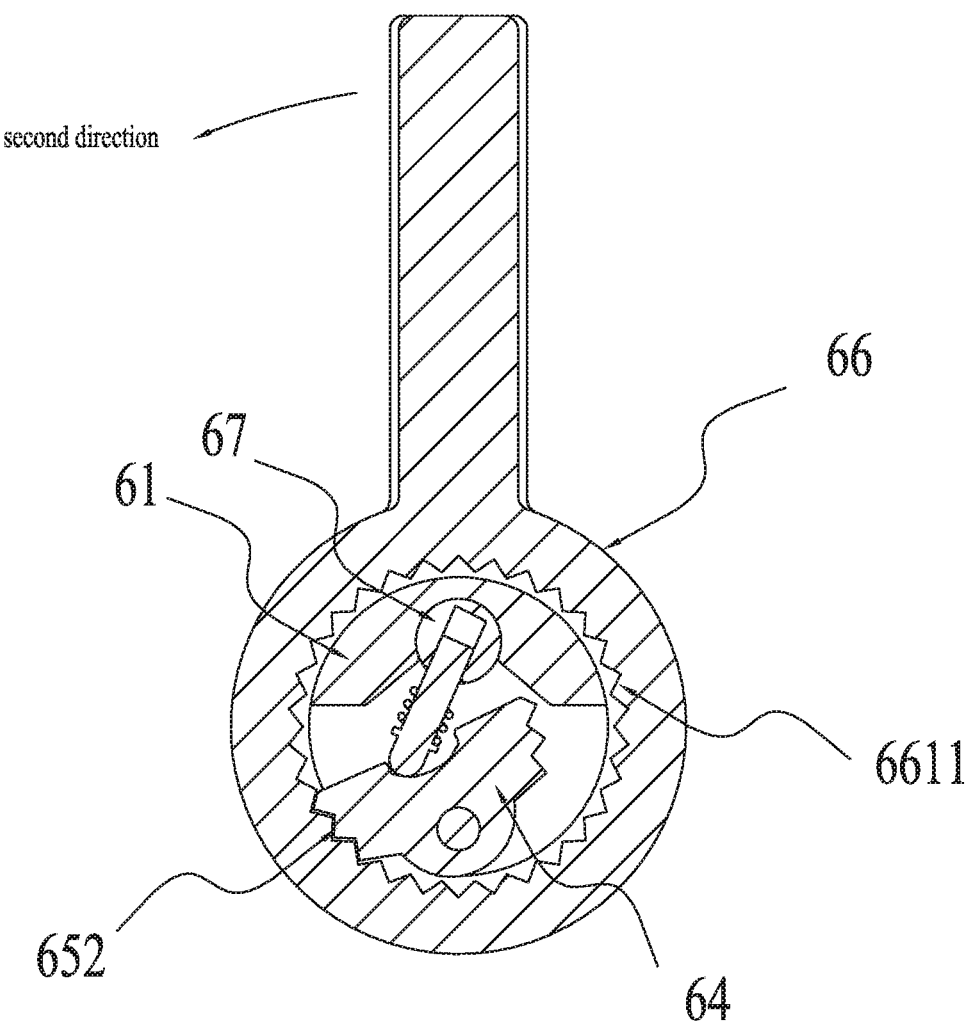
FIG. 7 is a section view of an exemplary control member in the second position and a second engaging portion engaging a annular gear of the chainsaw of FIG. 1.
Figure 8:
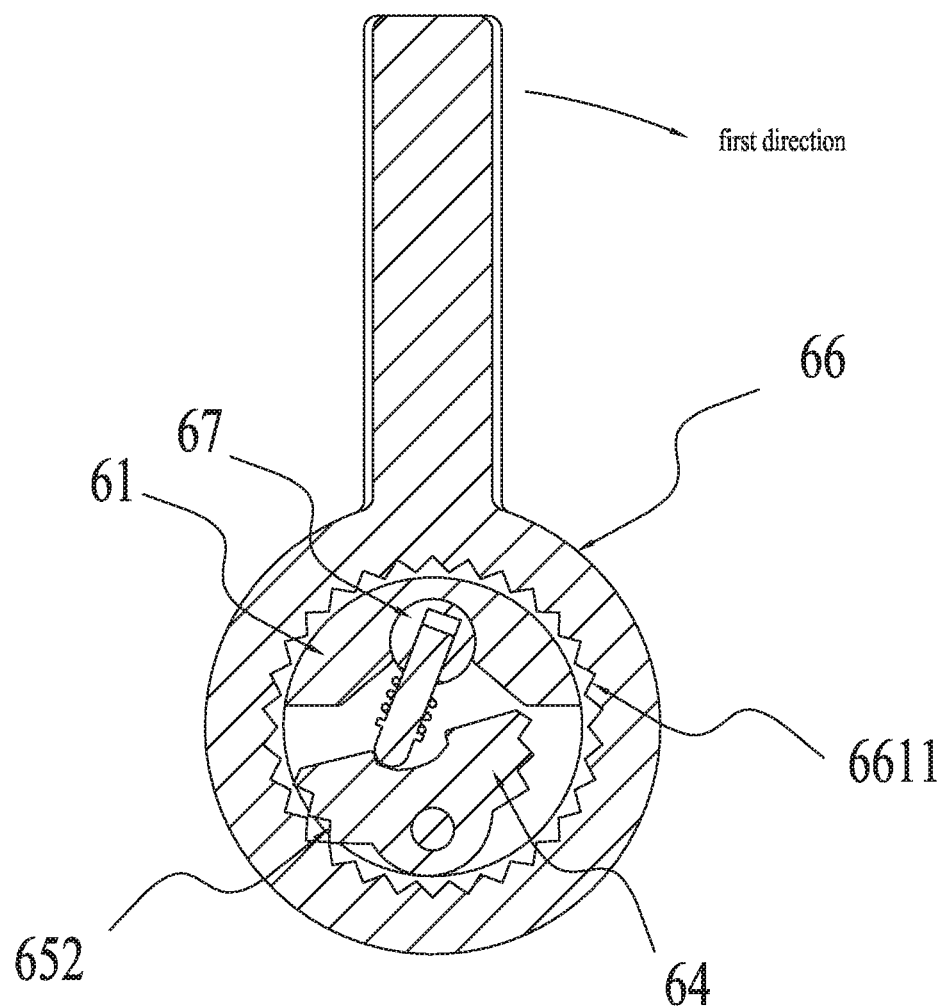
FIG. 8 is a section view of an exemplary control member in the second position and a second engaging portion disengaging a annular gear of the chainsaw of FIG. 1.

Referring to FIGS. 7-8, the control member 67 is in the second position. As shown in FIG. 7, the operating member 66 is swung back by an operator. The transmitting member 64 enables the driving member 61 to rotate synchronously with the operating member 66. The driving member 61 rotates synchronously with the operating member 66 when the operating member 66 is swung along a second direction which is opposite to the first direction. The operating member 66 drives the driving member 61 to rotate in the reverse direction. Therefore, the guide bar 50 can be driven by the driving member 61 to slide to loosen the saw chain 10. When the control member 67 is in the second position, the bias assembly 620 biases the transmitting member 64 to engage with the operating member 66. When the control member 67 is in the second position, the limiting member 62 touches the transmitting member 64 and enables the second engaging portion 652 to engage the annular gear 6611.

As shown in FIG. 8, when the operating member 66 is swung along a first direction which is opposite to the first direction, the operating member 66 rotates relative to the driving member 61. When the operating member 66 is swung forth, the transmitting member 64 enables the driving member 61 to rotate relative to the driving member 61. The second engaging portion 652 disengages the annular gear 6611. The operating member 66 cannot drive the driving member 61 to rotate and the driving member 61 keeps still. The guide bar 50 keeps still.

Referring to FIGS. 7-8, when the control member 67 is in the second position, the operating member 66 is swung by an operator to drive the driving member 61 to rotate in the reverse direction. The operating member 66 is swung forth and back by an operator, the driving member 61 rotates in the reverse direction. The driving member 61 cannot rotate in the forward direction. The driving member 61 drives the guide bar 50 to move back so as to loosen the saw chain 10, when the control member 67 is in the second position and the operating member 66 is swung by an operator.

Figure 9:
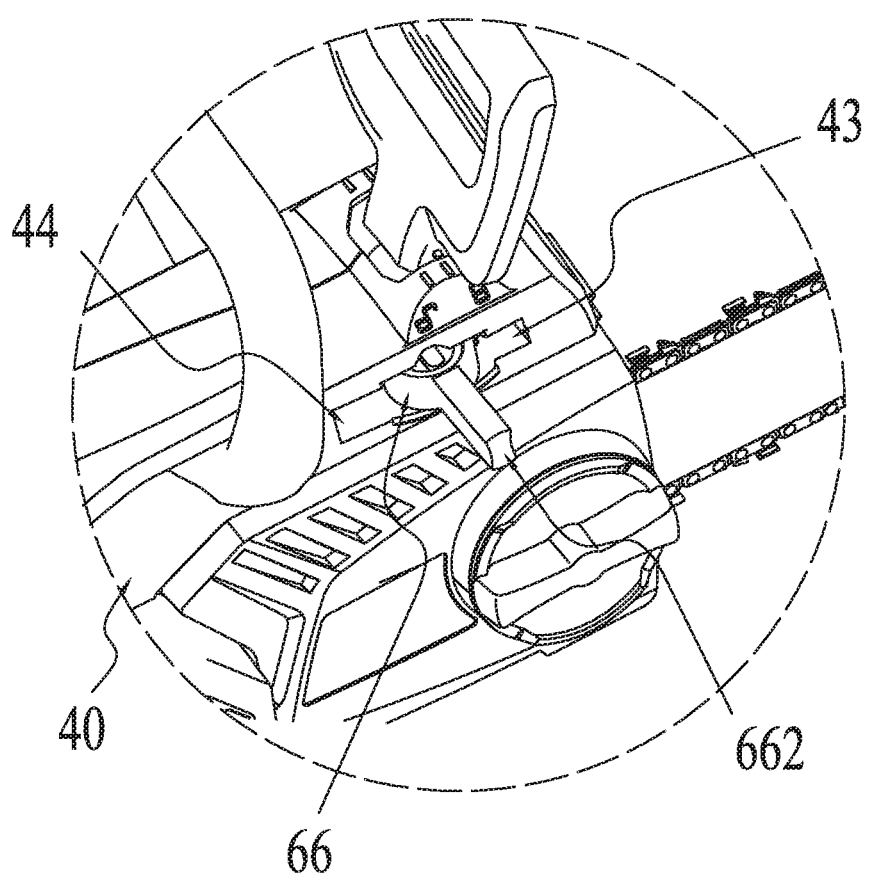
FIG. 9 is a partial enlarged view of FIG. 1.

As shown in FIG. 9, the operating member 66 may have an operating portion 662 for operator control. The housing 40 may form a receiving groove 43 and a receiving groove 44. The operating portion 662 can turn into the receiving groove 43 and 44 for storage. When the operating member 66 is in the working position, the operating portion 662 is projecting from the surface of the housing 40. When the operating member 66 is in the storage position, the operation portion 662 is under the surface of the housing 40. As one other embodiment, the operating portion of the operating member may be flexible. As another embodiment, the operating portion of the operating member may be folding.

Particularly, the handle 41 defines a plane, part of the handle 41 is symmetric with respect to the plane. The guide bar 50 and the operating member 66 is configured to the same side of the plane. The operating member 66 is close to the guide bar 50 than the one side of housing 40 opposite the guide bar 50. The operating member 66 is configured to one side of the chainsaw 100 which is close to the guide bar 50. The operating member 66 is configured to the top or bottom of the chainsaw 100.

The above illustrates and describes basic principles, main features and advantages of the present invention. Those skilled in the art should appreciate that the above embodiments do not limit the present invention in any form. Technical solutions obtained by equivalent substitution or equivalent variations all fall within the scope of the present invention.

What is claimed is:

1. A chainsaw comprising:
   a housing;
   a prime mover mounted to the housing;
   a saw chain driven by the prime mover;
   a guide bar for guiding the saw chain and slidably connected to the housing;
   a driving member for driving the guide bar to slide relative to the housing;
   an operating member configured to be operated by an operator to swing relative to the housing; and
   a control member movably connected to the driving member and configured to be operated by an operator to move to a first position or a second position relative to the driving member; and
   a transmitting member configured to rotatably connect to the driving member about a first axis and configured to perform a transmission between the operating member and the driving member,
   wherein the driving member is capable of driving the guide bar to tension the saw chain when the control member is in the first position and the operating member is swung by an operator and the driving member is capable of driving the guide bar to loosen the saw chain when the control member is in the second position and the operating member is swung by an operator.

2. The chainsaw of claim 1, wherein the driving member rotates in the forward direction when the control member is in the first position and the driving member rotates in the reverse direction when the control member is in the second position.

3. The chainsaw of claim 1, wherein the control member rotatably connects to the driving member.

4. The chainsaw of claim 1, further comprising a bias assembly for biasing the transmitting member to engage the operating member, wherein the bias assembly comprises a limiting member configured to slidably connect to the control member and a biasing member configured to connect between the limiting member and the control member.

5. The chainsaw of claim 4, wherein the operating member forms an annular gear and the transmitting member forms a first engaging portion engaging the annular gear when the control member is in the first position and enables the driving member to drive the guide bar to move to tension the saw chain and a second engaging portion engaging the annular gear when the control member is in the second position and enables the driving member to drive the guide bar to move to loosen the saw chain.

6. The chainsaw of claim 1, wherein the driving member rotates about a third axis which is parallel to the first axis and spaced away from the first axis.

7. The chainsaw of claim 6, wherein the operating member is swung about a second axis which is coaxial with the third axis.

8. The chainsaw of claim 1, wherein the operating member swings about a second axis which is perpendicular to the slide direction of the guide bar.

9. A chainsaw comprising:
   a housing;
   a prime mover mounted to the housing;
   a saw chain driven by the prime mover;
   a guide bar for guiding the saw chain and slidably connected to the housing;
   a driving member for driving the guide bar to slide relative to the housing;
   an operating member configured to be operated by an operator and swing relative to the housing;
   a transmitting member operable to perform a transmission between the operating member and the driving member, enable the driving member to rotate synchronously with the operating member when the operating member is swung along a first direction, and enable the operating member to rotate relative to the driving member when the operating member is swung along a second direction which is opposite to the first direction;
   a control member configured to be operated by an operator to move to a first position or a second position wherein the driving member rotates in a forward direction when the control member is in the first position the driving member rotates in a reverse direction when the control member is in the second position; and
   a bias assembly for biasing the transmitting member so that the transmitting member engages the operating member, wherein the bias assembly comprises a limiting member configured to slidably connect to the control member and a biasing member configured to connect between the limiting member and the control member.

10. The chainsaw of claim 9, wherein the transmitting member rotatably connects to the driving member about a first axis.

11. The chainsaw of claim 10, wherein the operating member rotates about a second axis which is parallel to the first axis and spaced from the first axis.

12. The chainsaw of claim 9, wherein the control member rotatably connects to the driving member.

* * * * *

UNITED STATES PATENT AND TRADEMARK OFFICE
CERTIFICATE OF CORRECTION

PATENT NO. : 10,376,973 B2
APPLICATION NO. : 15/234509
DATED : August 13, 2019
INVENTOR(S) : Fangjie Nie et al.

It is certified that error appears in the above-identified patent and that said Letters Patent is hereby corrected as shown below:

On the Title Page

(73) Assignee: [Chevron] should be "Chervon"

Signed and Sealed this
Fifth Day of November, 2024

Katherine Kelly Vidal
*Director of the United States Patent and Trademark Office*